(12) United States Patent
Carton et al.

(10) Patent No.: US 11,060,739 B2
(45) Date of Patent: Jul. 13, 2021

(54) AIR HANDLING UNIT

(71) Applicants: Carrier Corporation, Palm Beach Gardens, FL (US); Thomas Carton, Eloise (FR)

(72) Inventors: Thomas Carton, Eloise (FR); Samuel Duchet, Lyons (FR); Bertrand Jacquin, Saint Maximin (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 210 days.

(21) Appl. No.: 16/080,585

(22) PCT Filed: Mar. 4, 2016

(86) PCT No.: PCT/IB2016/000362
§ 371 (c)(1),
(2) Date: Aug. 28, 2018

(87) PCT Pub. No.: WO2017/149340
PCT Pub. Date: Sep. 8, 2017

(65) Prior Publication Data
US 2019/0049125 A1    Feb. 14, 2019

(51) Int. Cl.
*F24F 3/044*    (2006.01)
*F16B 19/02*    (2006.01)
(Continued)

(52) U.S. Cl.
CPC ............ *F24F 3/044* (2013.01); *B65D 88/022* (2013.01); *F16B 19/02* (2013.01); *F24F 13/20* (2013.01); *F24F 2221/36* (2013.01)

(58) Field of Classification Search
CPC ........ F24F 3/044; F24F 13/20; F24F 2221/36; F16B 19/02; B65D 88/022
(Continued)

(56) References Cited

U.S. PATENT DOCUMENTS

| 204,347 A | 5/1878 | Lyons |
| 3,695,139 A | 10/1972 | Howe |

(Continued)

FOREIGN PATENT DOCUMENTS

| CN | 103241254 A | 8/2013 |
| CN | 104154610 A | 11/2014 |

(Continued)

OTHER PUBLICATIONS

International Search Report and Written Opinion for application PCT/IB2016/000362, dated Nov. 11, 2016, 10 pages.
(Continued)

*Primary Examiner* — Steven B McAllister
*Assistant Examiner* — Allen R Schult
(74) *Attorney, Agent, or Firm* — Cantor Colburn LLP

(57) ABSTRACT

The invention concerns an air handling unit (1) comprising a structural frame (3, 5, 19b, 19c) supporting a housing made of flat insulating panels (7, 7b, 7c) and being divided in at least two modules (2b, 2c) enclosing air handling components, the modules (2b, 2c) being attached together by fastening systems (15) comprising a first portion (151) integral with a first module (2b), attached to a second portion (153) integral to a second module (2c). The first and second portion (151, 153) are formed by identical mechanical parts each comprising a conical protrusion (1511, 1531) and a conical recess (1513, 1533), and the first and second portions (151, 153) are respectively mounted on the first and second modules (2b, 2c) so that the conical protrusion (1511) of the first portion (151) is received in the conical recess (1533) of the second portion (153), and that the conical recess (1513) of the first portion (151) receives the conical protrusion (1531) of the second portion (153).

7 Claims, 5 Drawing Sheets

(51) Int. Cl.
*F24F 13/20* (2006.01)
*B65D 88/02* (2006.01)

(58) Field of Classification Search
USPC .......................................................... 454/284
See application file for complete search history.

(56) References Cited

U.S. PATENT DOCUMENTS

| | | | |
|---|---|---|---|
| 3,711,902 A | 1/1973 | Eggert | |
| 3,752,511 A | 8/1973 | Racy | |
| 4,344,716 A | 8/1982 | Sigal | |
| 4,819,820 A | 4/1989 | Weiner | |
| 4,942,975 A | 7/1990 | Capron et al. | |
| 4,993,125 A | 2/1991 | Capron et al. | |
| 5,129,239 A | 7/1992 | Thurman | |
| 6,030,014 A | 2/2000 | Vaillancourt et al. | |
| 6,205,738 B1 | 3/2001 | Chen | |
| 6,725,507 B2 | 4/2004 | Reynard | |
| 6,877,939 B2 | 4/2005 | Tomkins et al. | |
| 8,002,490 B2 * | 8/2011 | Hamlen | B65D 7/44 |
| | | | 206/509 |
| 2003/0009969 A1 | 1/2003 | Herbeck et al. | |
| 2007/0052333 A1 | 3/2007 | Freire | |
| 2007/0271857 A1 | 11/2007 | Heather et al. | |
| 2011/0237177 A1 | 9/2011 | Stewart et al. | |
| 2015/0111484 A1 | 4/2015 | Son et al. | |
| 2015/0111485 A1 | 4/2015 | Son et al. | |
| 2015/0111488 A1 | 4/2015 | Son et al. | |
| 2017/0023747 A1 * | 1/2017 | Zbinden | G02B 6/3672 |
| 2017/0234345 A1 * | 8/2017 | Morimoto | A47B 83/001 |
| | | | 439/577 |

FOREIGN PATENT DOCUMENTS

| | | |
|---|---|---|
| CN | 204301225 U | 4/2015 |
| CN | 104748342 A | 7/2015 |
| DE | 3017103 A1 | 11/1981 |
| EP | 2818429 A1 | 12/2014 |
| GB | 2438806 A | 12/2007 |
| KR | 100806124 B1 | 2/2008 |
| KR | 20100040602 A | 4/2010 |

OTHER PUBLICATIONS

Chinese Office Action for application CN 201680083153.4, dated Apr. 7, 2020, 7 pages.

* cited by examiner

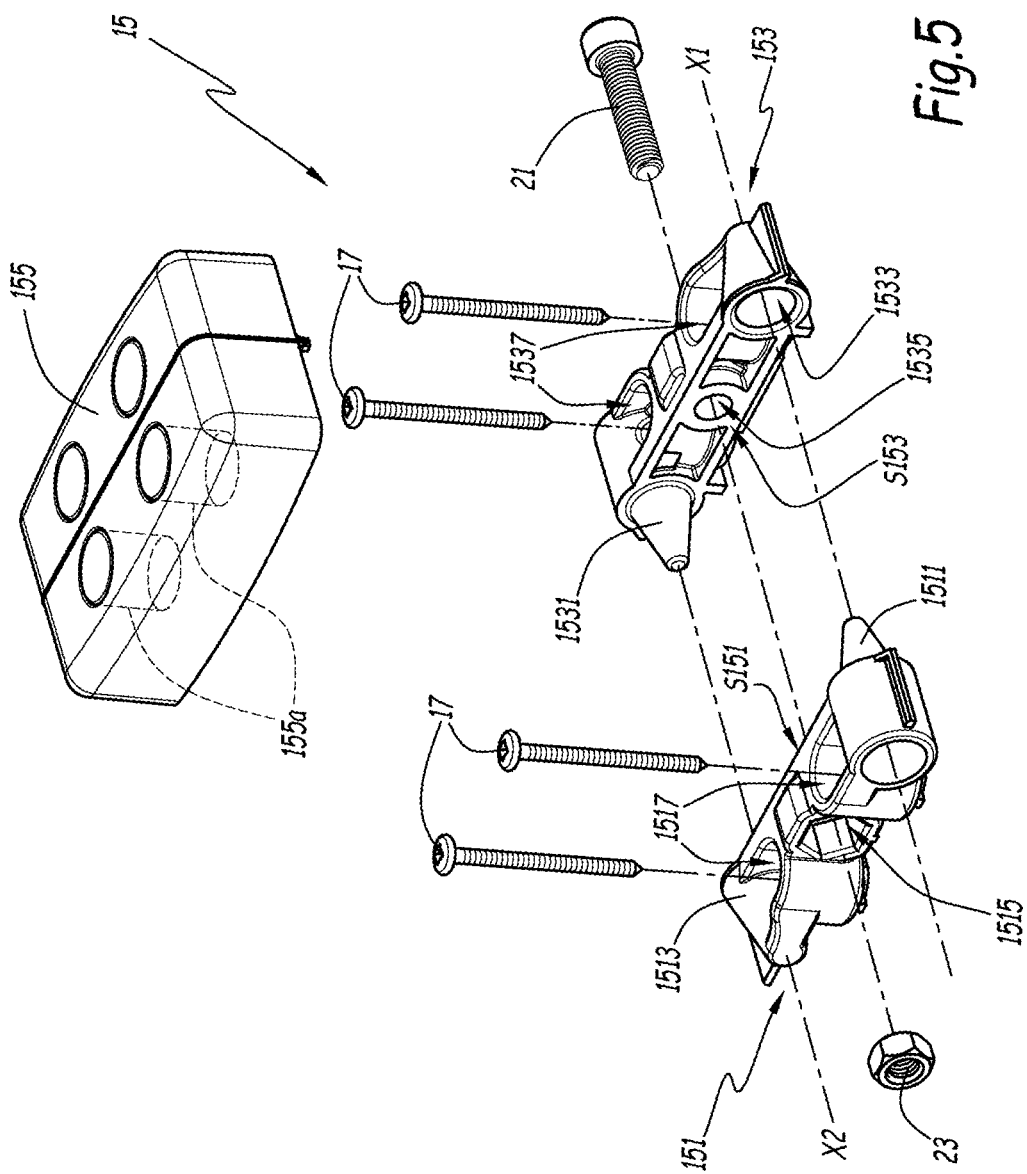

AIR HANDLING UNIT

The invention concerns an air handling unit.

It is known to implement air handling units on buildings, especially office buildings or supermarkets, for treating the air contained inside the buildings. Such air handling units usually have inlet and outlet openings, for the air to be circulated through the unit, and a plurality of components, each relative to a function for treating the air, such as circulating, filtering, depolluting, humidifying, drying, heating, cooling, or the like. These components are enclosed inside a structural frame, supporting a housing made of flat insulating panels, forming a protective thermal barrier of the air handling unit.

The components of the air handling unit are generally distributed in several modules of the air handling unit, which comprise their own structural frame and housing, and which are assembled together to form the air handling units. The modules are manufactured independently, transported and assembled in their place of installation, for example on a rooftop. This makes the transportation of the various components of the air handling unit easier.

The modules have to be accurately mounted with respect to each other because of air tightness issues. Considering that the surfaces on which the modules are installed may not be perfectly even, positioning issues may occur and lead to air tightness defects if the edges of the modules do not perfectly close the air tunnel. The modules are therefore linked together with fastening and aligning means which permit a tight link between the modules and to reduce the air tightness issues. However, the known techniques do not provide a satisfying enough positioning and air tightness.

The aim of the invention is to provide a new air handling unit in which the modules comprising the various components are linked together thanks to fastening systems which guarantee better positioning and air tightness.

To this end, the invention concerns an air handling unit comprising a structural frame supporting a housing made of flat insulating panels and being divided in at least two modules enclosing air handling components, the modules being attached together by fastening systems comprising a first portion integral with a first module, attached to a second portion integral to a second module. This air handling unit is characterized in that the first and second portion are formed by identical mechanical parts each comprising a conical protrusion and a conical recess, and in that the first and second portions are respectively mounted on the first and second modules so that the conical protrusion of the first portion is received in the conical recess of the second portion, and that the conical recess of the first portion receives the conical protrusion of the second portion.

Thanks to the invention, the modules are progressively and accurately centered with respect to one another by the conical shapes provided on the fastening systems, which helps to improve air tightness.

According to further aspects of the invention, such an air handling unit may incorporate one or several of the following features:
- Each of the first and second portions is fixed to the first and second modules by screws inserted in bars belonging to the structural frame of the air handling unit.
- Each of the first and second portions is fixed to the first and second modules by two screws.
- The first and second portions are attached together by at least one bolt and nut assembly.
- The first and second portions comprise a central housing in which is inserted the bolt, said housing being provided with a portion having a shape complementary to the outer shape of the nut.
- The conical protrusion of the first portion and the recess of the second portion are centered on a first central axis, whereas the conical recess of the first portion and the conical protrusion of the second portion are centered on a second central axis, and whereas the first and second central axes are parallel.
- The central axes are perpendicular to contacting edges and to the side panels of the first and second modules along which the first and second portions are fixed.
- The fastening systems further comprise a cover part mounted on the first and second portions and adapted to hide the first and second portions.
- The first and second portions are made of a plastic material.
- The first and second portions are mounted on an outer side of the air handling unit.

The invention will now be explained with reference to the annexed drawings, as an illustrative example:

FIG. 5 is an exploded perspective view of a fastening system belonging to the air handling unit according to the invention.

Figure 1:
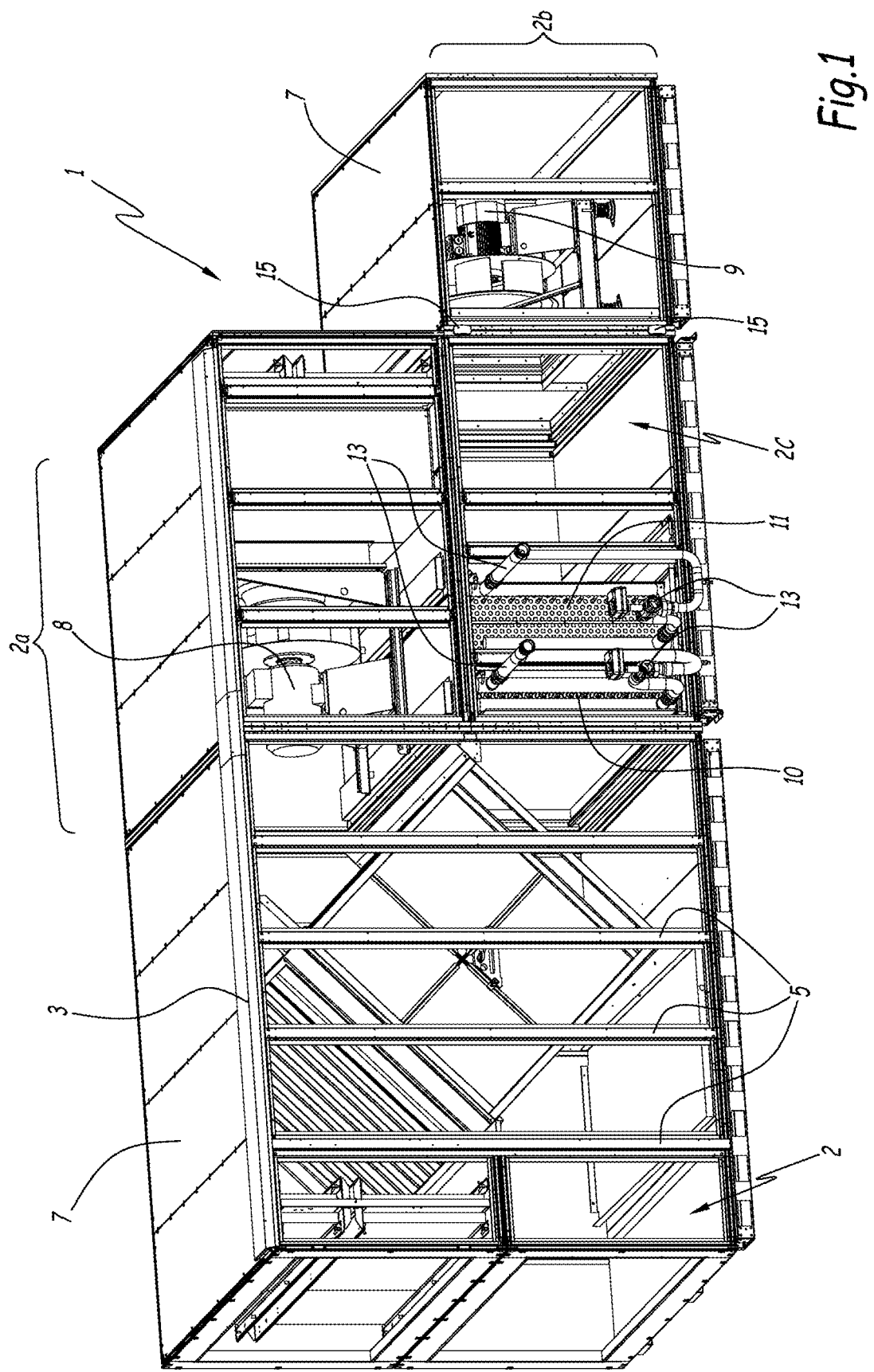
FIG. 1 is a perspective view of an air handling unit according to the invention.

FIG. 1 shows an air handling unit 1 which comprises a plurality of modules 2 and a plurality of components. Each module 2 comprises a structural frame formed by horizontal bars 3 and vertical bars 5. The horizontal and vertical bars 3 and 5 support a housing made of flat insulating panels 7, some of these panels 7 being represented on FIG. 1 on top surfaces of the air handling unit 1. Each module 2 of the air handling unit 1 includes at least one component, of which some of them are represented on FIG. 1. Two ventilators 8 and 9 equipped with motors are represented in modules 2a and 2b.

To guarantee accurate positioning and air tightness between the various modules of the air handling unit 1, the modules are attached together by fastening systems 15, two of them being represented on FIG. 1 linking two modules 2b and 2c.

Figure 2:
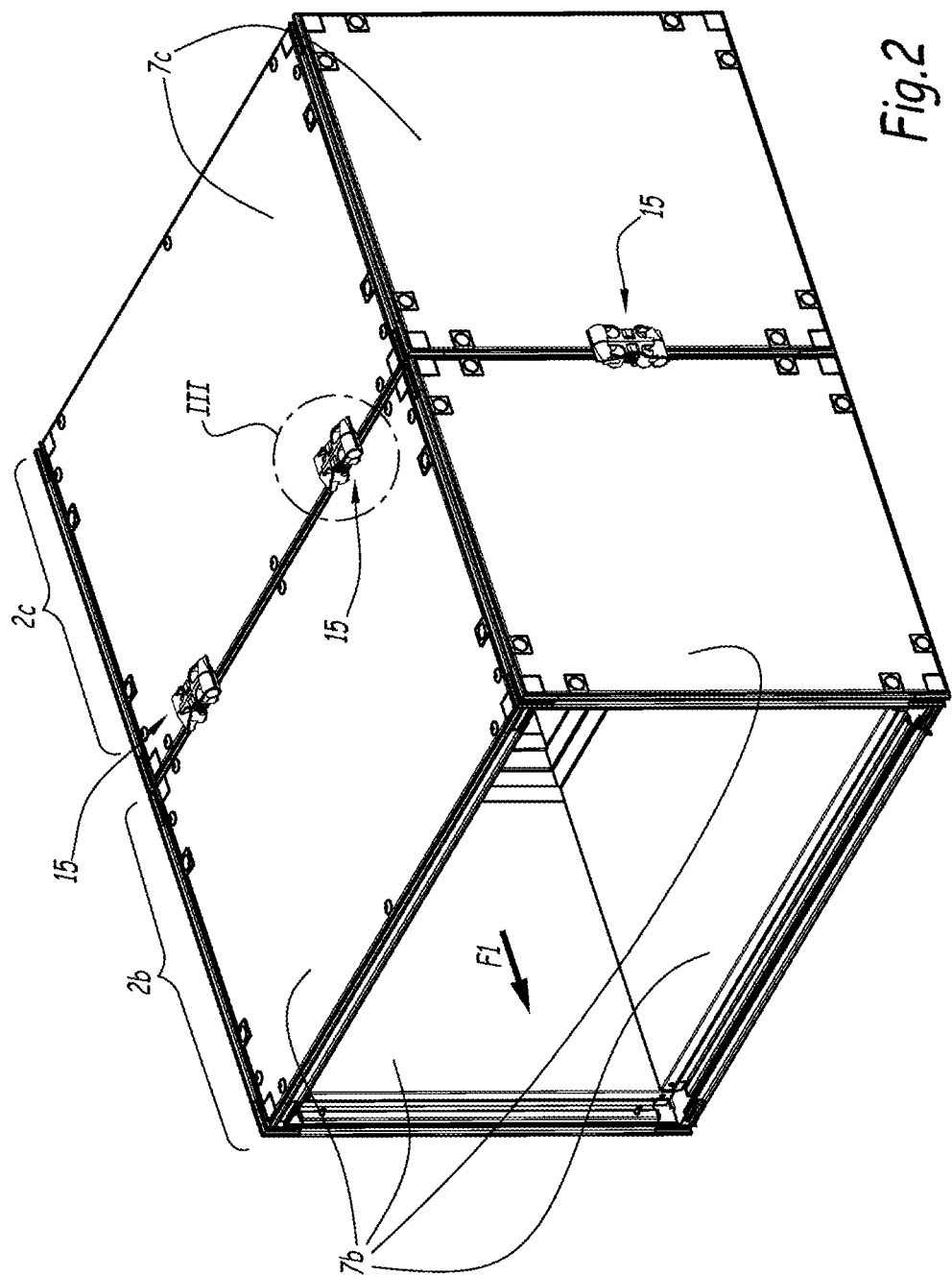
FIG. 2 is a perspective view, from a different angle, of two modules of the air handling unit of FIG. 1, linked together with fastening systems.
Figure 3:
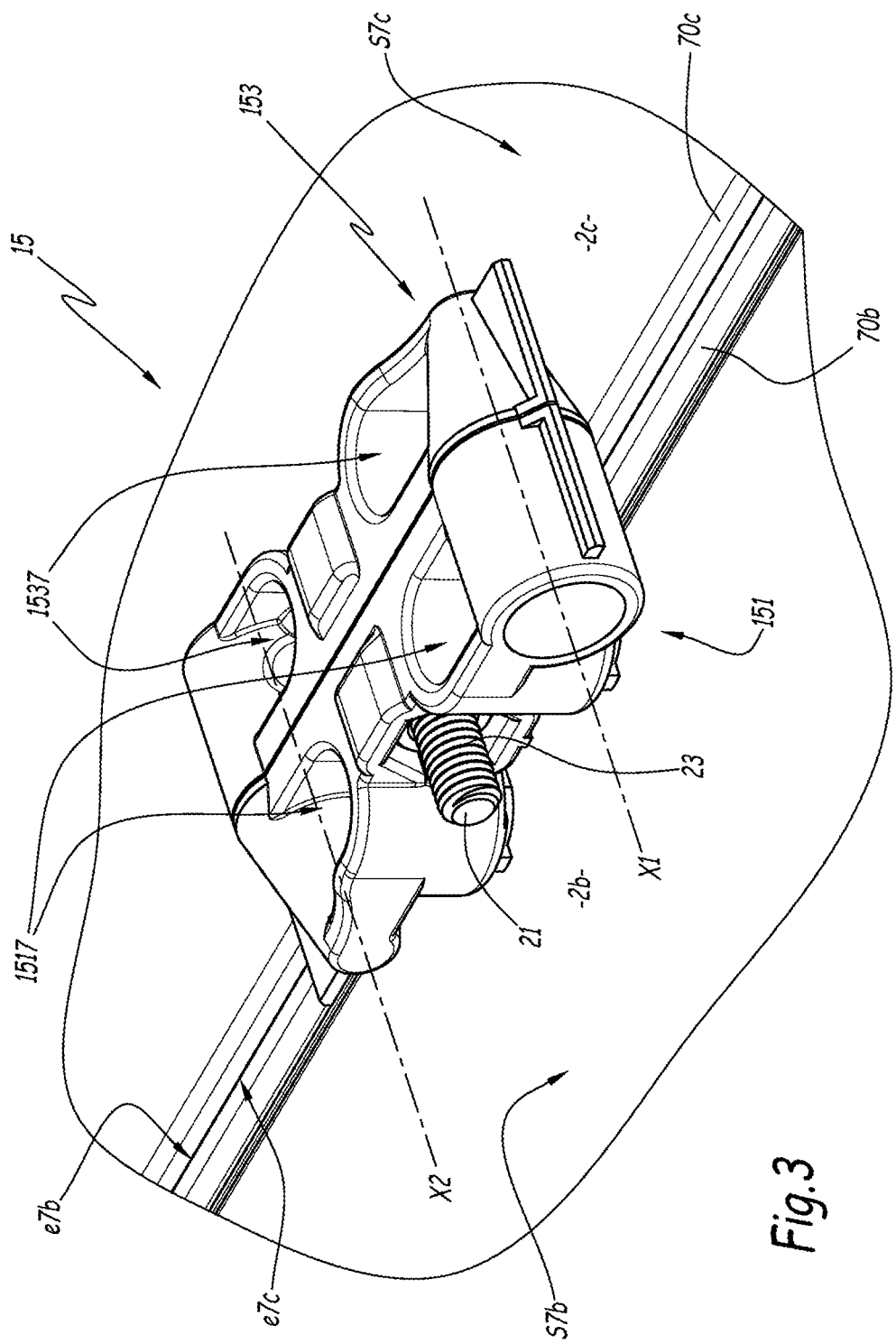
FIG. 3 is a view at a larger scale of a fastening system shown on detail Ill on FIG. 2.

The modules 2b and 2c and the fastening systems 15 are described more precisely in FIG. 2. The modules 2b and 2c comprise respective panels 7b and 7c. The fastening systems 15 are mounted on an outer side of the air handling unit 1, so that the fastening systems 15 are not in contact with the air flow F1 circulating on the inside of the air handling unit 1. This permits manufacturing the fastening systems 15 from a plastic material.

Each fastening system 15 comprises a first portion 151 and a second portion 153. The first portion 151 is integral with the first module 2b, while the second portion 153 is integral with the second module 2c. The first portion 151 is mounted against an outer surface S7b of a panel 7b, while the second portion 153 is mounted against an outer surface S7c of a panel 7c. The first and second portions 151 and 153 are placed facing each other along abutting edges e7b and e7c of the panels 7b and 7c.

The first portion 151 and the second portion 153 are formed by identical mechanical parts. This permits improvement of the manufacturing efficiency. For instance, the first and second portions 151 and 153 may be manufactured by plastic injection.

Each of the first and second portions 151 and 153 comprises a respective conical protrusion 1511 and 1531, and a respective conical recess 1513 and 1533. The conical protrusion 1511 and the recess 1531 are centered on a central axis X1, while the conical protrusion 1513 and the recess 1533 are centered on a central axis X2, the central axes X1 and X2 being parallel to each other. Axes X1 and X2 are also perpendicular to the contacting edges e7b and e7c and parallel to the side panels 7b and 7c.

Figure 4:
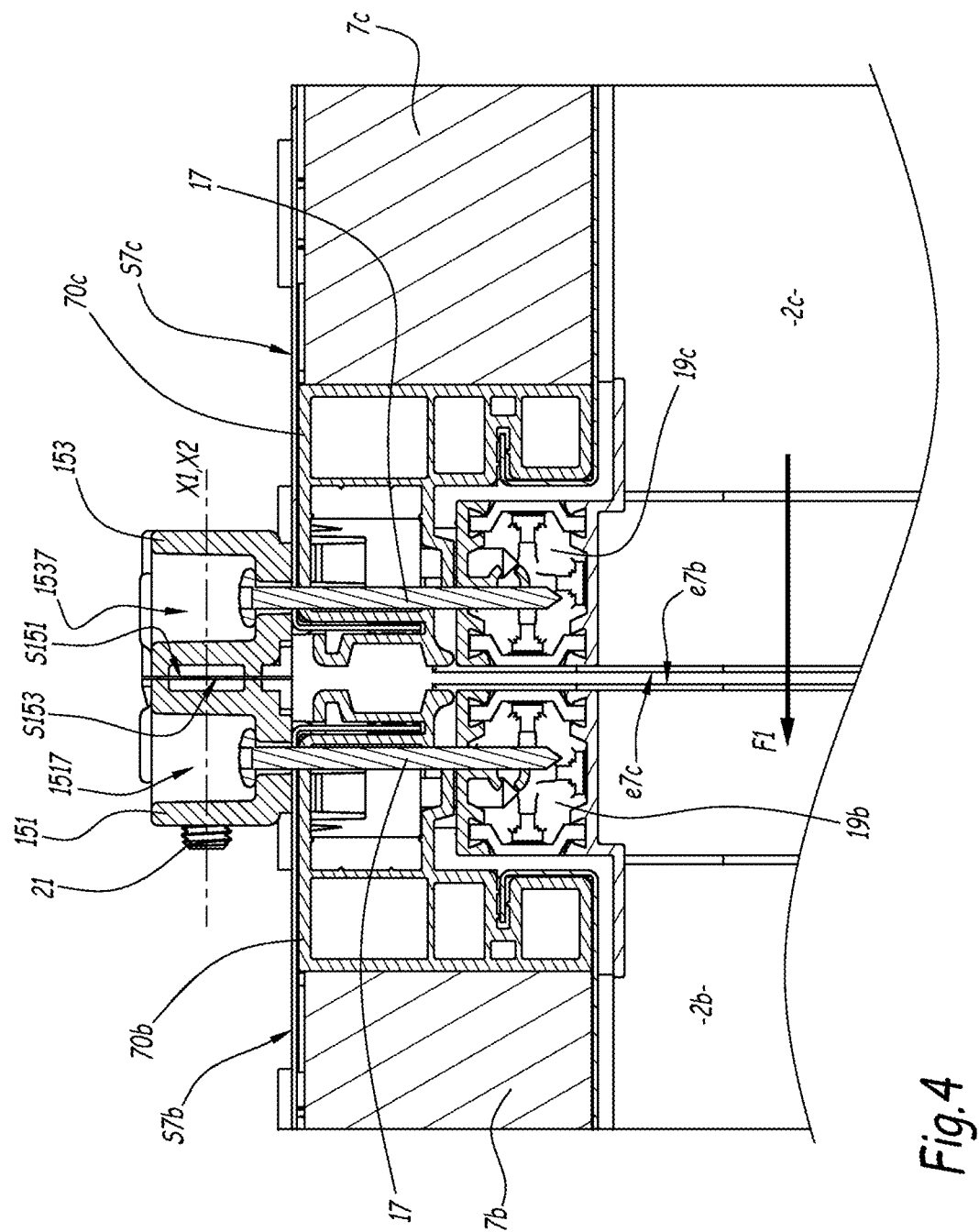
FIG. 4 is a sectional view of the fastening system of FIG. 3.

The conical protrusions 1511 and 1531 extend from respective planar surfaces S151 and S153 of the first and second portions 151 and 153. Planar surfaces S151 and S153 come into contact with each other when the first and second portions 151 and 153 are assembled, as shown in FIG. 4. The recesses 1513 and 1533 are formed by cavities extending from surfaces S151 and S153. The central axes X1 and X2 are perpendicular to the surfaces S151 and S153.

The first and second portions 151 and 153 are mounted on modules 2b and 2c in inverted positions, so that the conical protrusion 1511 is received in the recess 1533, and that the recess 1513 receives the conical protrusion 1531.

The conical shape of the protrusions 1511 and 1531 and the recesses 1513 and 1533 allow a progressive centering which improves the mechanical connection between modules 2b and 2c, and thus the air tightness of the air handling unit 1.

Each of the first and second portions 151 and 153 is fixed respectively to the first and the second modules 2b and 2c by screws 17 inserted through respective edge profiles 70b and 70c of the panels 7b and 7c, and in bars 19b and 19c similar to the horizontal and vertical bars 3 and 5 belonging to the structural frame of the modules 2b and 2c. For instance, each of the first and second portions 151 and 153 is fixed to the first or second modules 2b and 2c by two screws 17. The first and second portions 151 and 153 each comprise two respective holes 1517 and 1537 provided for passing the screws 17.

The edge profiles 70b and 70c are themselves fixed to the bars 19b and 19c by fastening means such as screws which are not shown here.

The first and second portions 151 and 153 are attached together by one bolt and nut assembly, including a bolt 21, inserted in central housings 1515 and 1535 of the first and second portions 151 and 153. For instance, the central housings 1515 and 1535 may be located between the holes 1517 and 1537. A portion of the housing 1515 and 1535 is provided with a shape corresponding to the outer shape of the nut 23. In the example shown, the nut 23 has an outer hexagonal shape complementary to a hexagonal shape of the housing 1515.

As a non-shown variant, the first and second portions 151 and 153 may be attached together using more than one bolt and nut assembly.

The fastening systems 15 further comprise a cover part 155 mounted on the first and second portions 151 and 153, and which is adapted to hide the first and second portions 151 and 153. The cover part 155 may comprise one or more positioning fingers 155a, protruding from an inner side of the cover part 155, and adapted to be mounted in the holes 1517 and 1537 of the first and second portions 151 and 153.

When an operator has to assemble the modules 2b and 2c of the air handling unit 1, he only has to mount and fasten the portions 151 and 153 on the panels 7b and 7c of the modules 2b and 2c so that the portions 151 and 153 are inverted with respect to each other. The operator directly screws the screws 17 in the edge profiles 70b and 70c and in the bars 19b and 19c. For instance, screws 17 may be self-drilling screws. Alternatively, the operator may first drill holes in the edge profiles 70b and 70c and in the bars 19b and 19c before inserting the screws 17.

The operator positions the modules 2b and 2c against each other in the intended configuration, then inserts the bolt 21 through both portions 151 and 153 and screws the bolt 21 in the nut 23, which is maintained in position by the corresponding shape of the housing 1515 or 1535 in which the nut 23 is mounted. The progressive screwing of the bolt 21 into the nut 23 induces progressive insertion of the conical protrusions 1511 and 1531 into the conical recesses 1513 and 1533, thus providing a progressive and accurate centering of the modules 2b and 2c with respect to one another. The use of conical shapes allows a positioning in directions perpendicular and parallel to the panels 7.

Although only two modules 2b and 2c are represented being attached with fastening systems 15, more than two modules of the air handling unit 1 may be attached with the fastening systems 15. Furthermore, even if only three fastening systems 15 are shown on FIG. 2 for attaching the modules 2b and 2c, two modules may be attached by only two fastening systems 15, or by more than three fastening systems 15 depending on the length or the size of the panels 7.

The invention claimed is:

1. Air handling unit comprising a structural frame supporting a housing made of flat insulating panels and being divided in at least two modules enclosing air handling components, the modules being attached together by fastening systems comprising a first portion integral with a first module, attached to a second portion integral to a second module, wherein the first and second portion are formed by identical mechanical parts each comprising a conical protrusion and a conical recess, and wherein the first and second portions are respectively mounted on the first and second modules so that the conical protrusion of the first portion is received in the conical recess of the second portion, and that the conical recess of the first portion receives the conical protrusion of the second portion;
   wherein the first and second portions are attached together by at least one bolt and nut assembly;
   wherein the first and second portions comprise a central housing in which is inserted the bolt, said housing being provided with a portion having a shape complementary to an outer shape of the nut.

2. Air handling unit according to claim 1, wherein each of the first and second portions is fixed to the first and second modules by screws inserted in bars belonging to the structural frame of the air handling unit.

3. Air handling unit according to claim 1, wherein the conical protrusion of the first portion and the recess of the second portion are centered on a first central axis, wherein the conical recess of the first portion and the conical protrusion of the second portion are centered on a second central axis, and wherein the first and second central axes are parallel.

4. Air handling unit according to claim 3, wherein the central axes are perpendicular to contacting edges and to the insulating panels of the first and second modules along which the first and second portions are fixed.

5. Air handling unit according to claim 1, wherein the fastening systems further comprise a cover part mounted on the first and second portions and adapted to hide the first and second portions.

6. Air handling unit according to claim 1, wherein the first and second portions are made of a plastic material.

7. Air handling unit according to claim 1, wherein the first and second portions are mounted on an outer side of the air handling unit.

* * * * *